(12) United States Patent
Mendes, Jr.

(10) Patent No.: US 6,289,637 B1
(45) Date of Patent: Sep. 18, 2001

(54) STRUCTURE WITH INTEGRAL GAME

(75) Inventor: John F. Mendes, Jr., Daytona Beach, FL (US)

(73) Assignee: Bob's Space Racers, Inc., Daytona Beach, FL (US)

( * ) Notice: Subject to any disclaimer, the term of this patent is extended or adjusted under 35 U.S.C. 154(b) by 0 days.

(21) Appl. No.: 09/195,778

(22) Filed: Nov. 18, 1998

Related U.S. Application Data

(60) Provisional application No. 60/065,621, filed on Nov. 18, 1997.

(51) Int. Cl.[7] ................................................. E04B 1/343
(52) U.S. Cl. ................................. 52/66; 52/79.1; 52/143
(58) Field of Search ............................... 52/66, 79.5, 143, 52/69, 79.1

(56) References Cited

U.S. PATENT DOCUMENTS

| | | | |
|---|---|---|---|
| 3,583,755 | * | 6/1971 | Hedrick, Jr. .......................... 296/170 |
| 4,852,309 | * | 8/1989 | Stamp, Sr. ............................. 52/79.6 |
| 5,179,801 | * | 1/1993 | Babchuk ................................. 49/58 |
| 5,238,283 | * | 8/1993 | Teigen ................................. 296/24.1 |
| 5,908,279 | * | 6/1999 | Mote .................................... 414/542 |
| 6,017,081 | * | 1/2000 | Colby ................................... 296/173 |
| 6,070,555 | * | 6/2000 | Stubbs ................................. 119/712 |

* cited by examiner

*Primary Examiner*—Christopher T. Kent
*Assistant Examiner*—Jennifer I. Thissell
(74) *Attorney, Agent, or Firm*—Standley & Gilcrest LLP

(57) ABSTRACT

A portable arcade unit having a frame, a means for attaching a wheel means, a means for attaching a hitch means, and a detachable roof. The portable arcade unit may be disassembled for storage and transportation purposes and quickly rebuilt on-site to form an aesthetically pleasing building unit.

29 Claims, 10 Drawing Sheets

STRUCTURE WITH INTEGRAL GAME

This application claims the priority of provisional application 60/065,621 filed on Nov. 18, 1997.

BACKGROUND OF THE INVENTION

The present invention relates to the general field of arcade games, and more particularly, to a portable arcade game.

Arcade games of many sorts have provided much enjoyment to the public for many years. Arcade games housed in stationary buildings have been around for years. Additionally, arcade games housed in trailers have also been known. Users of these large arcade games (such as amusement parks) often rearrange the layout of the park or phase out old games with new ones. Unfortunately, stationary arcade games are typically large and rooted to one spot. To move these stationary arcade games is burdensome as disassembly and transport of these games requires extensive effort. On the other hand, trailer-type arcade games have generally not been implemented by large amusement parks because these amusement parks feel that the trailers are unsightly and do not portray the type of image the park is looking for (i.e., amusement parks such as Disney do not want to give the impression of a mobile circus or fair). Accordingly, there is a need for an arcade game housed in a "building" type structure, portraying the image of being stationary, and yet adapted to be easily moved or transported to another site or park.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAIL DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
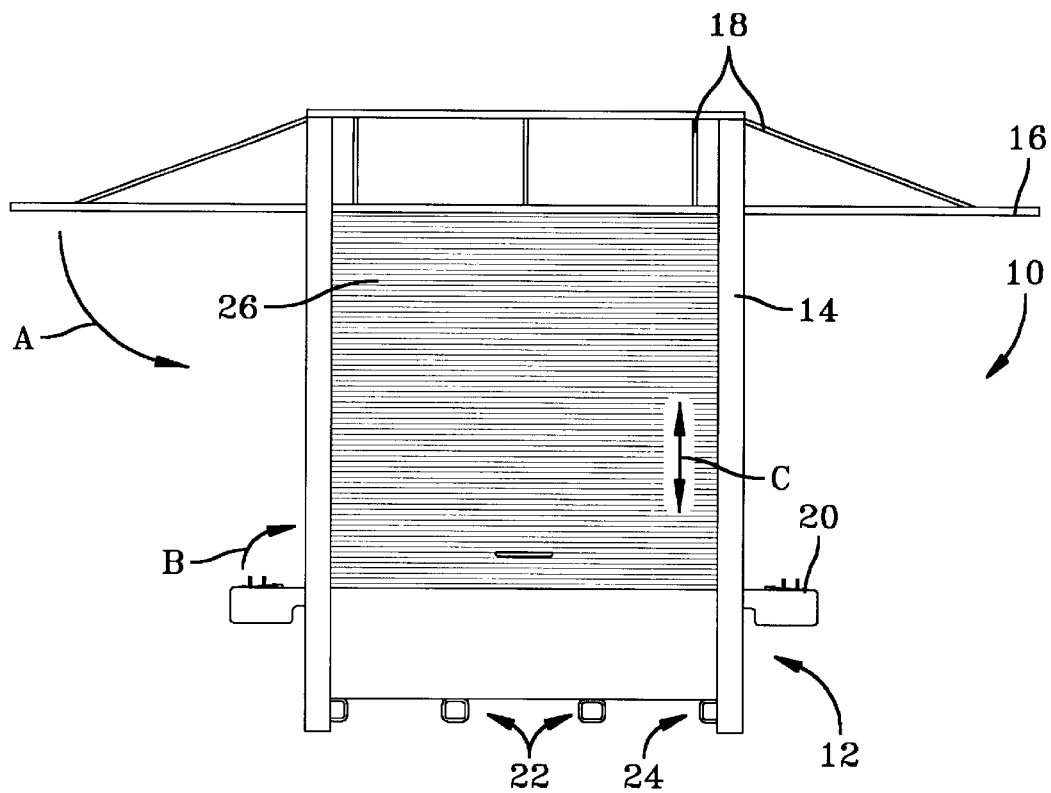
FIG. 1 illustrates an end elevational view of one embodiment of the portable arcade unit.

FIG. 1 illustrates an end elevational view of one embodiment of the portable arcade unit 10 of the present invention (detachable roof not shown). In one embodiment, the portable arcade unit 10 of the present invention is comprised of: a frame 12 comprised of four uprights 14; and at least one awning 16 hingeably attached to the unit. The awning 16 may be propped in an up position when the portable unit is in a player ready mode and wherein said awning may be lowered when in a storage mode. "Player ready" mode merely refers to the state where the unit is ready for players to play the game installed within the unit. For example, in one embodiment of the invention, in a player ready mode, the awnings 16 are in a propped up position, the game consoles 20 are down and ready for players, and all the exterior doors are moved or removed allowing access to the game. It is also preferred that any transportation devices such as wheels and hitches are removed.

Referring to FIG. 1, the game consoles 20 may be moved up into the unit in the direction of arrow B for storage purposes. The game consoles 20 are preferably hinged so that they may be propped up so that the roll down doors 26 and awnings 16 may be secured to the side of the unit without interference from the game console 20. The game consoles 20 may be equipped with mechanisms particular to the game installed within the unit. For example, if the game is a shooting game, the console 20 will be equipped with a game gun. The awnings 16 may be lowered in the direction of arrow A in a non-player ready mode. The roll-up doors 26 may be moved in the direction of arrow C. The roll-up doors 26 are moved to the up position to allow the player to have access to the game. It is preferred that awnings 16 be placed around all sides of the unit. Game cabinets and consoles 20 may be installed so that players play along the side of the unit. The game unit may also be configured so that players may play at both the sides and ends of the unit.

Figure 2:
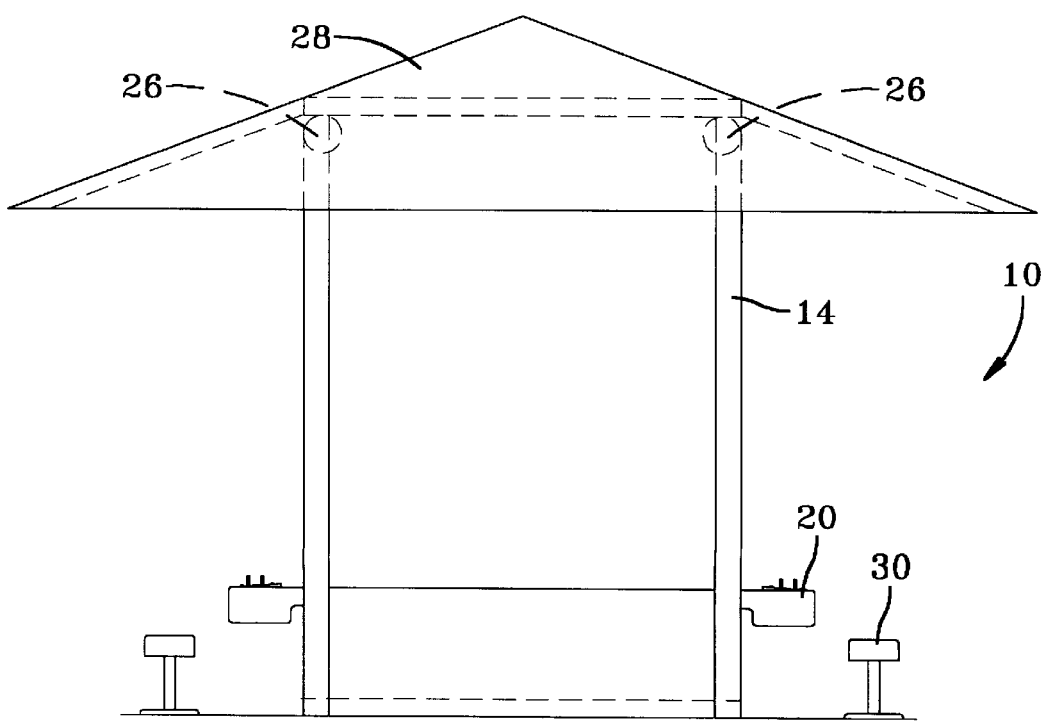
FIG. 2 illustrates another embodiment of the present invention having a detachable roof.

The embodiment of the present invention shown in FIG. 1 does not have a detachable roof. FIG. 2 illustrates another embodiment of the present invention having a detachable roof 28. As illustrated, in use, a row of seats 30 are placed in front of the consoles 20.

Figure 3B:
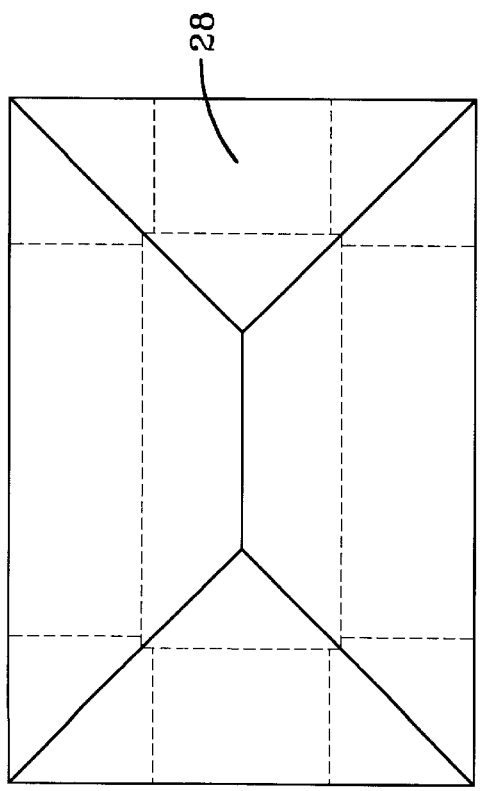
FIG. 3B illustrates a top plan view of one embodiment of the detachable roof 28 of the present invention.
Figure 3C:
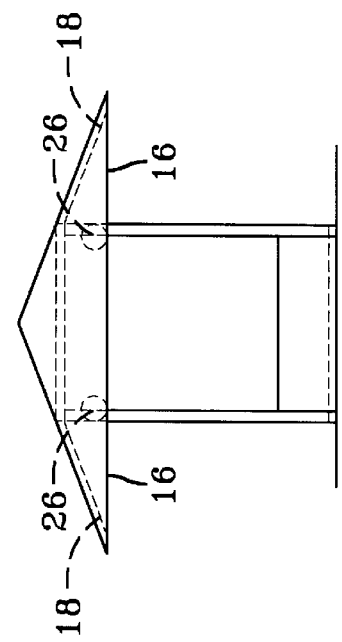
FIG. 3C illustrates an end elevational view of one embodiment of the present invention.
Figure 3A:
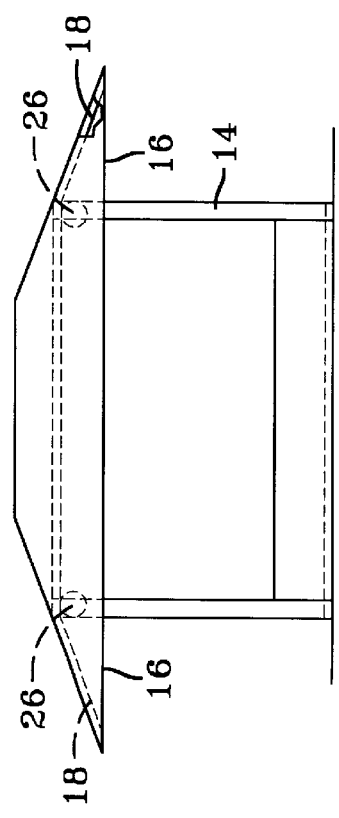
FIG. 3A illustrates a side elevational view of one embodiment of the present invention.

FIG. 3A illustrates a side elevational view of one embodiment of the present invention. FIG. 3C illustrates an end elevational view of one embodiment of the present invention. As illustrated in this embodiment, the detachable roof 28 resides on and is secured to the awnings 16. In one embodiment, the detachable roof 26 rests on a leading edge of the awnings 16 and the corner caps (see discussion of FIGS. 6 and 7 below). As illustrated, the prop rods 18, held in place by brackets, support the awnings in the open position (e.g., in a player ready mode). FIG. 3B illustrates a top plan view of one embodiment of the detachable roof 28 of the present invention.

Figure 4C:
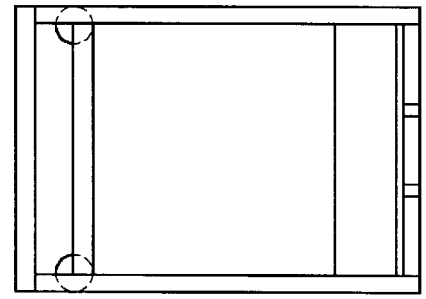
FIGS. 4A–4C illustrate views of various parts of the frame of the present invention.
Figure 4B:
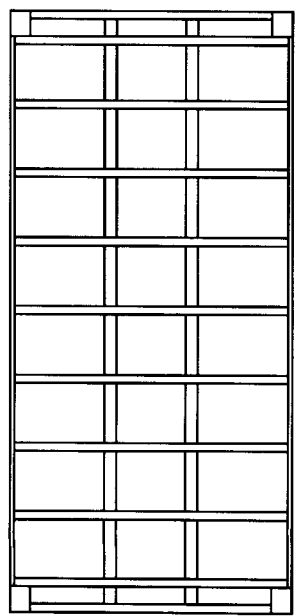
Figure 4A:
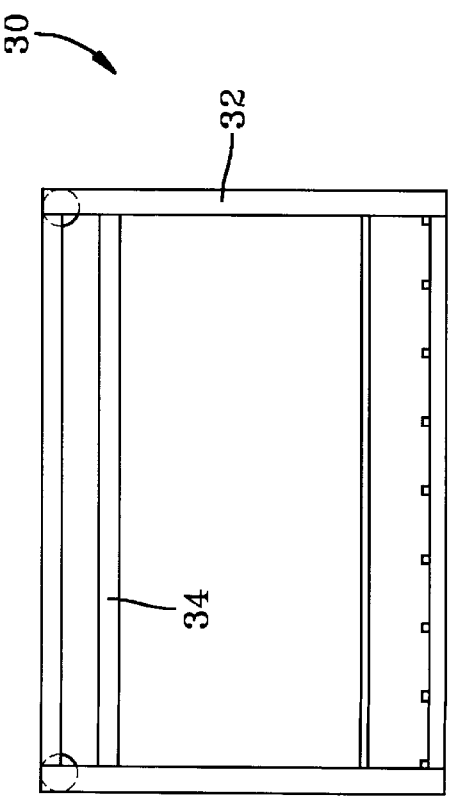

FIGS. 4A–4C illustrate views of various parts of the frame of the present invention. FIG. 4A illustrates one embodiment of the frame 30 of the present invention. The frame 30 is comprised of uprights 32, cross beams 34, floor frame (see FIG. 4B). As illustrated, it is preferred that the frame 30 consist of steel tubing, however other equivalent materials may be used (i.e. wood, plastic). The floor frame consists of steel tubing placed in a criss-cross pattern as shown. A steel panel floor may be placed over the floor frame for further support.

Figure 5:
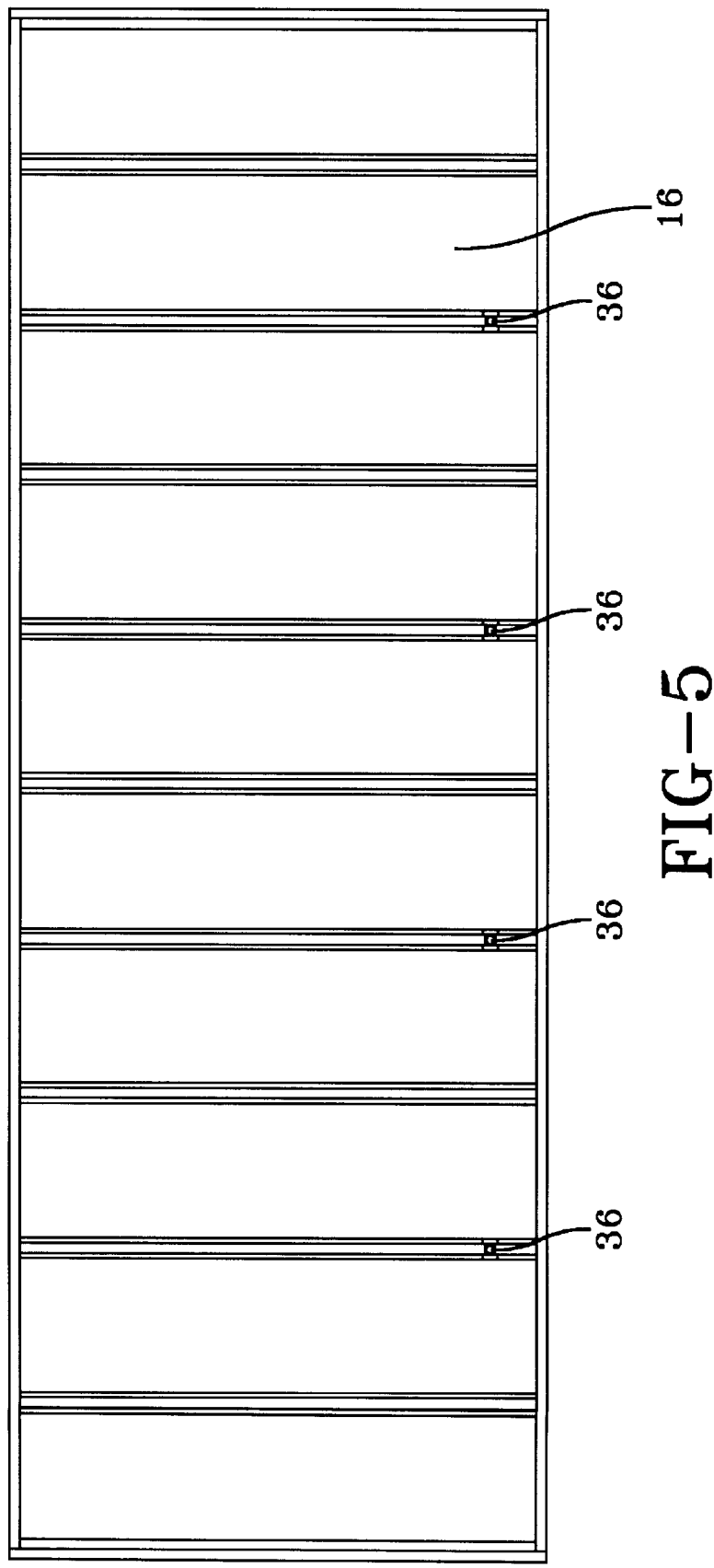
FIG. 5 illustrates one embodiment of an awning 16 of the present invention.

FIG. 5 illustrates one embodiment of an awning 16 of the present invention. The awning 16 may be propped in the open position by attaching prop rods 18 to prop rod brackets 36. The awnings 16 provide a decorative and weather shielding border around the sides of the unit of the present invention.

Figure 6:
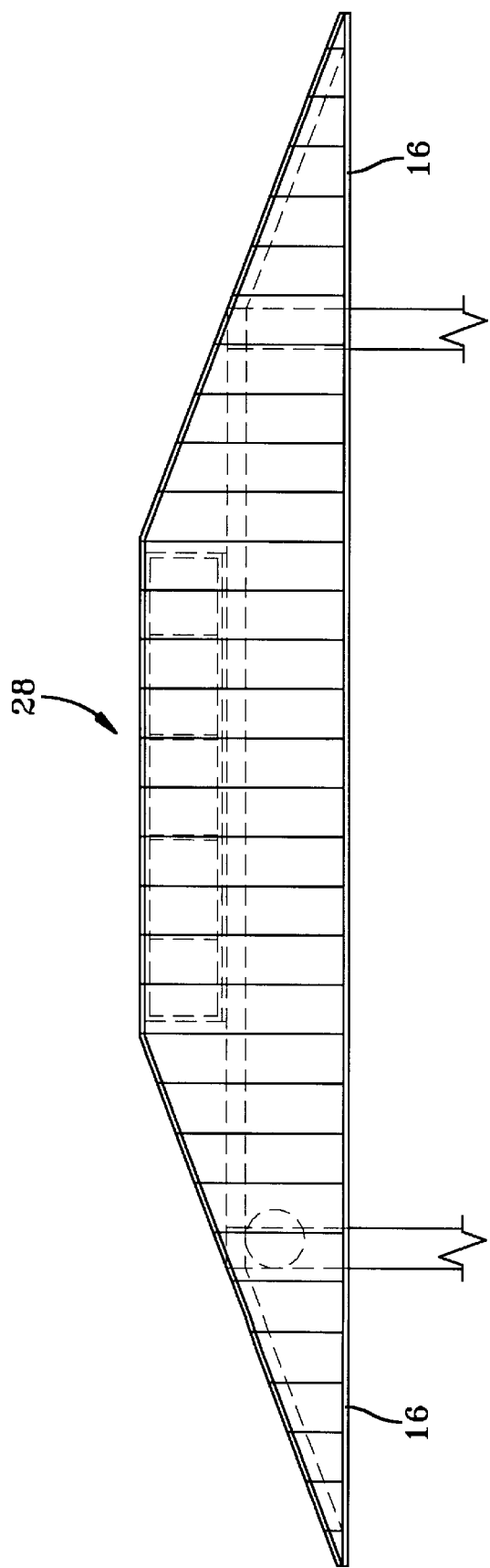
FIG. 6 illustrates a side elevational view of one embodiment of the detachable roof of the present invention.
Figure 7:
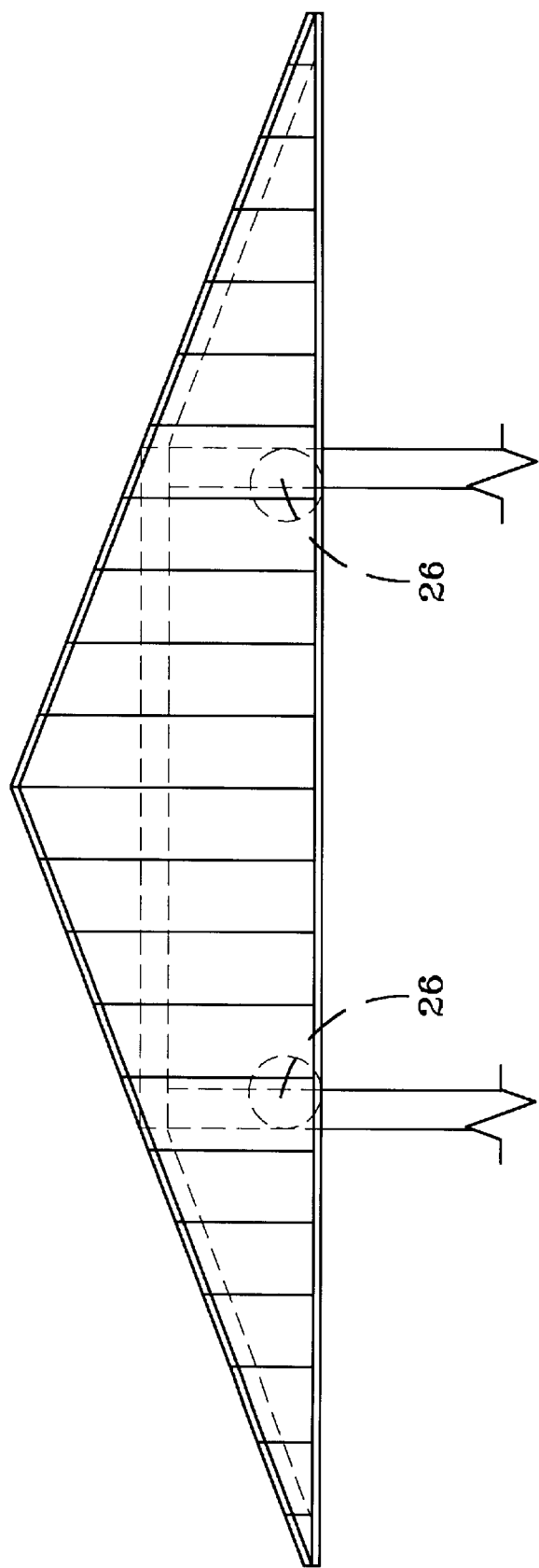
FIG. 7 illustrates a side end view of the detachable roof of FIG. 6.
Figure 8:
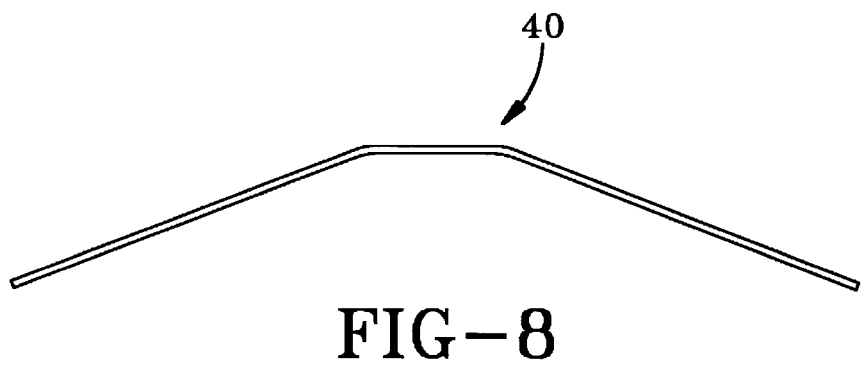
FIG. 8 illustrates one embodiment of the top ridge support.
Figure 9:
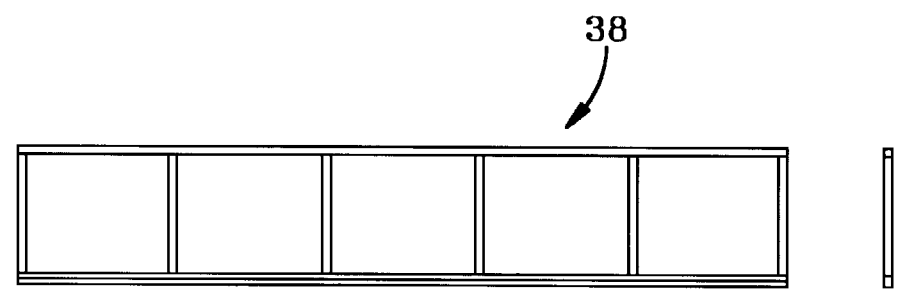
FIG. 9 illustrates one embodiment of the top center support.
Figure 10:
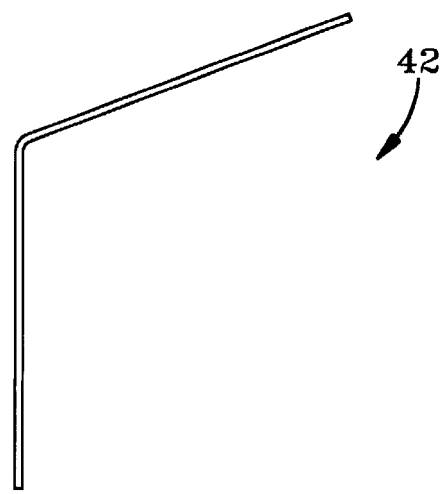
FIG. 10 illustrates one embodiment of the middle support.
Figure 11:
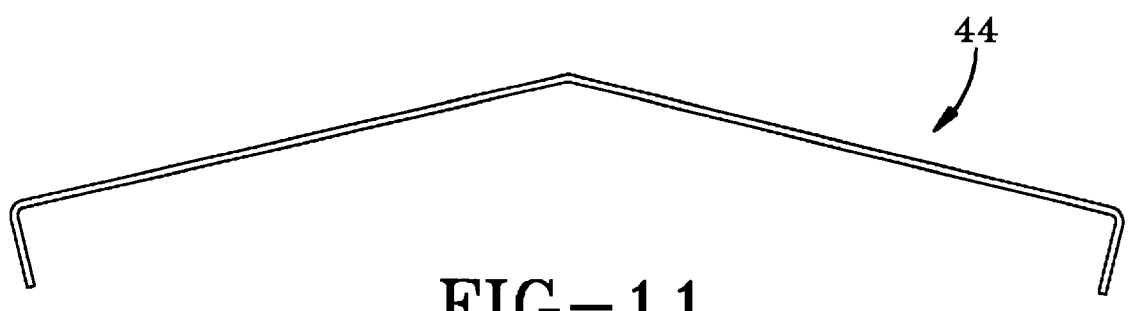
FIG. 11 illustrates one embodiment of a side corner cap of the present invention.
Figure 12:
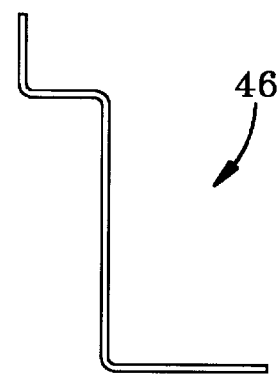
FIG. 12 illustrates one embodiment of a side corner cap filler of the present invention.
Figure 13:
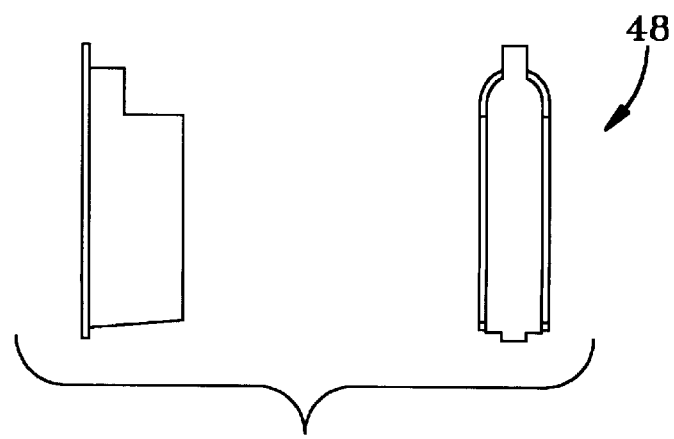
FIG. 13 illustrates one embodiment of a roof end cap of the present invention.
Figure 14:
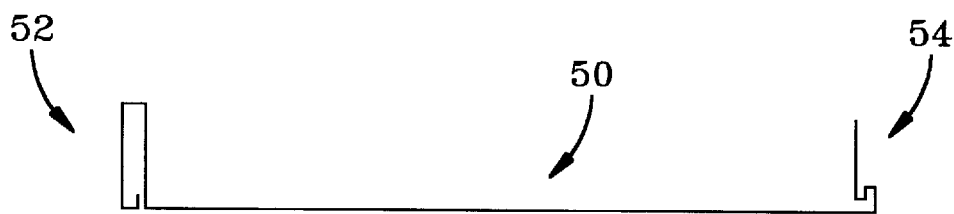
FIG. 14 illustrates one embodiment of a roof panel.
Figure 15:
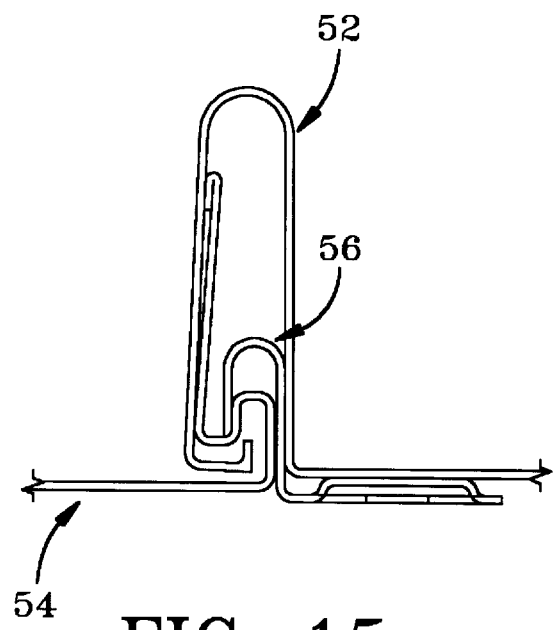
FIG. 15 illustrates one embodiment of a roof panel connection.
Figure 16:
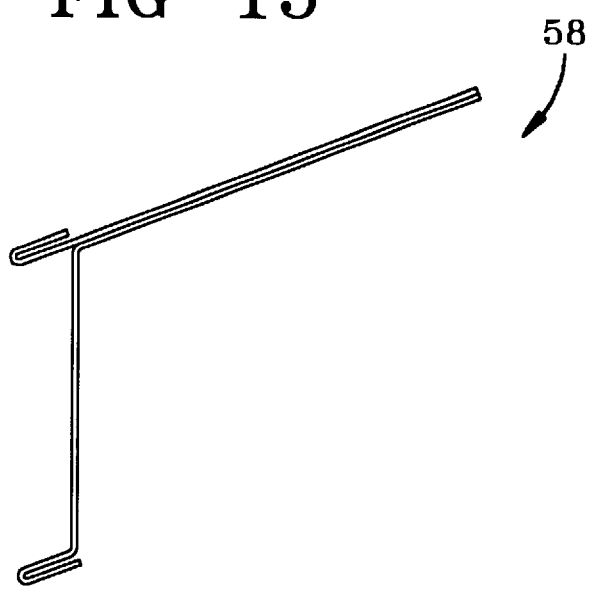
FIG. 16 illustrates a drip edge of one embodiment of the present invention.

FIG. 6 illustrates a side elevational view of one embodiment of the detachable roof 28 of the present invention. FIG. 7 illustrates a side end view of the detachable roof of FIG. 6. The detachable roof structure provides aesthetic qualities to the invention as well as providing a run-off for rain and shelter for players. In one embodiment, the detachable roof is supported and connected to the propped up awning portions. The edges of the detachable roof 28 preferably resides on and is secured to the awnings 16. The detachable roof 28 may be supported on the top of the unit by placing a top center support 38 on the top of the game unit 10. The top center support 38 is illustrated in FIG. 9. The top center support 38 may be made from aluminum tubing. The top ridge support 40 resides on top of the top center support (see FIG. 8). The middle support 42 is shown in FIG. 10. FIG. 11 illustrates one embodiment of a side corner cap 44 of the present invention. FIG. 12 illustrates one embodiment of a side corner cap filler 46 of the present invention. FIG. 13 illustrates one embodiment of a roof end cap 48 of the present invention. FIG. 14 illustrates one embodiment of a roof panel 50 of the present invention. The roof panel 50 has a first end 52 and a second end 54. To install the roof panels 50, a roof clip 56 engages the second end of a first roof panel 50 and a first end of another roof panel 50 engages the roof clip 56/first end 52 combination (see FIG. 15). FIG. 16 illustrates a drip edge 58 of one embodiment of the present invention. The elements illustrated in FIGS. 8–16 are attached as shown in FIGS. 6 and 7 to form one embodiment of a detachable roof 28 of the present invention. This detachable roof 28 may be quickly constructed on-site to provide an aesthetically pleasing and safe roof for the portable game unit of the present invention.

Figure 17:
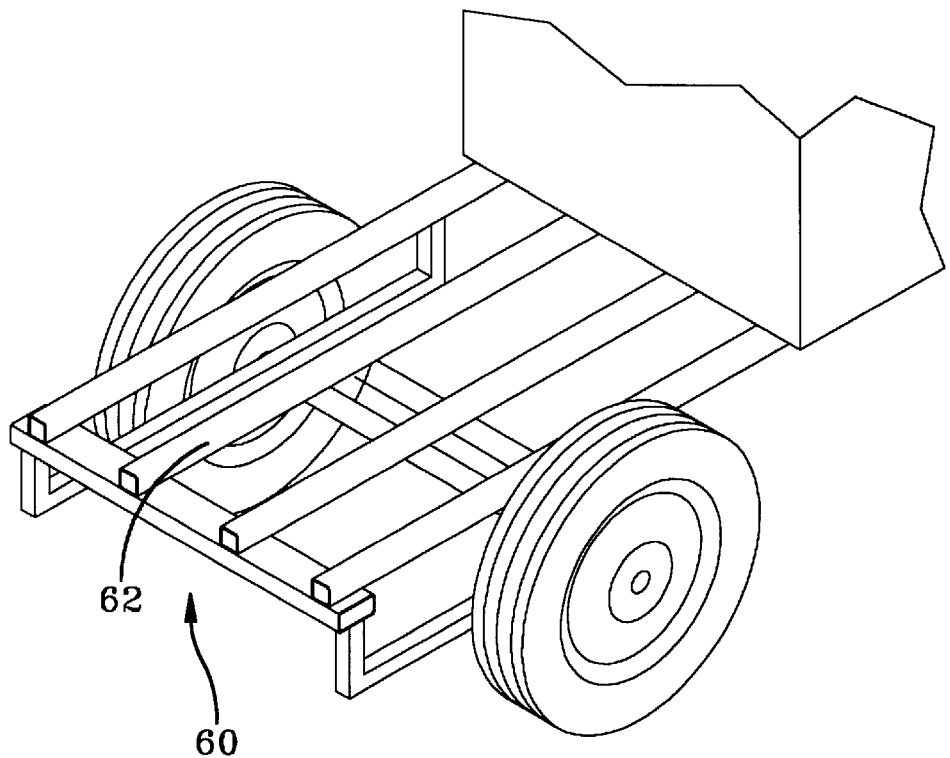
FIG. 17 illustrates one embodiment of a wheel means of the present invention.

FIG. 17 illustrates one embodiment of a wheel means of the present invention. The bogie 60 illustrated in FIG. 17 is attached to one end of the portable unit of the present invention. In the embodiment of FIG. 17, the bogie 60 is attached to the unit via elongated tubular members 22, 24 running along a predetermined length of the unit. In one embodiment, the tubular members 22, 24 run along a bottom of the unit from a first end to a second end of the unit. In the embodiment illustrated in FIG. 1, four tubular members 22, 24 are used.

The tube members 62 of the bogie 60 in FIG. 17 engage the tubular members 22, 24 attached to the portable unit. These tube members 62, 22, 24 may then be attached by using bolts and/or U bolts. It is appreciated that other wheel means and attachment means may be used. In an alternate embodiment, separate wheels may be placed at the bottom of the unit.

Figure 18:
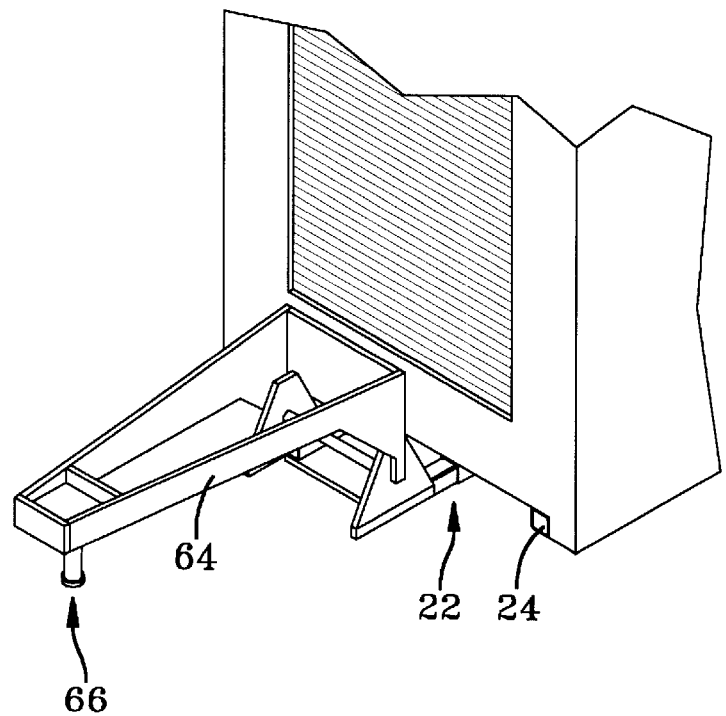
FIG. 18 illustrates one embodiment of a hitch of the present invention.

FIG. 18 illustrates one embodiment of a hitch 64 of the present invention. The hitch 64 is attached to a second end of the portable unit. In the embodiment of FIG. 18, the hitch 64 is attached to the unit via the tubular members 22 located at the bottom of the portable unit. The hitch 64 may be attached to a truck, or other vehicle, via known attachment means generally at 66. With the bogie 60 and hitch 64 attached, the unit may be pulled from one location to another. Upon arriving at the new location, the bogie 60, or any other wheel means used, and the hitch 64 may be removed from the unit. The roll-up doors 26 may be opened, the awnings 16 and consoles 20 may be put in player ready mode, the detachable roof 28 may be installed, and the portable unit, which now looks like a fixed building, is ready for game play. The unit is lifted to a predetermined height to meet transport regulations.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. The present application should not be construed as limiting the portable unit to one type of game. It is the intention, therefore, to limit the invention only as indicated by the scope of the claims.

What is claimed is:

1. A portable arcade unit comprising:

(a) a frame, said frame comprising four uprights;

(b) a floor section supported by said frame;

(c) a first connection apparatus secured to a first end of said unit;

(d) a bogie, said bogie adapted to connect to said first connection apparatus, said bogie comprising at least one wheel positioned so as to elevate said first end of said unit when said bogie is connected to said unit;

(e) a second connection apparatus secured to a second end of said unit;

(f) a hitch portion, said hitch portion having a first end adapted to connect to said second connection apparatus and a second end adapted to connect to a vehicle capable of moving said unit, said hitch portion adapted to support and elevate said second end of said unit, when connected to said vehicle, such that said unit is completely elevated and supported when said bogie and said hitch portion, attached to said vehicle, are connected to said unit;

(g) a pair of game cabinets located in said unit wherein a first game cabinet extends down one side of said unit and wherein a second cabinet extends down a second side of said unit; and wherein said unit is adapted to house an arcade game, and wherein said unit is stationary and self-supporting when detached from said bogie and said hitch portion, and wherein said unit is elevated and may be moved when said hitch portion, attached to said vehicle, and said bogie are secured to said unit.

2. A portable arcade unit according to claim 1, wherein said second connection apparatus comprises a steel tube attached to said second end of said portable arcade unit.

3. A portable arcade unit according to claim 1, wherein said second connection apparatus is comprised of a plurality of tubes secured to the bottom of said unit, said plurality of tubes having openings for engaging said hitch portion at said second end of said unit.

4. A portable arcade unit according to claim 3, wherein said plurality of tubes run from said second end of said unit to said first end of said unit, and where said plurality of tubes have openings at said first end for engaging said bogie.

5. A portable arcade unit according to claim 1, further comprising:
at least one pair of side cross bars and one pair of end cross bars attached to said frame.

6. A portable arcade unit according to claim 5, further comprising:
a second pair of side cross bars and a second pair of end cross bars attached to said frame, wherein said first pair of side and end cross bars are secured to a bottom portion of said four uprights and wherein said second pair of side and end cross bars are secured to a top portion of said four uprights.

7. A portable arcade unit according to claim 1, further comprising:
a detachable roof supported by said frame.

8. A portable arcade unit according to claim 1, further comprising:
lower side panels attached to said four uprights.

9. A portable arcade unit according to claim 1, further comprising:
a pair of game consoles, each one of said game consoles hingeably attached to a corresponding one of said game cabinets, wherein each of said game consoles are adapted to rest on said frame when in a player ready mode and wherein each of said game consoles are adapted to reside in an interior space of said unit when in a transport mode.

10. A portable arcade unit according to claim 1, further comprising:
a gateway located at one end of said unit for allowing persons to enter said unit.

11. A portable arcade unit according to claim 1, further comprising:
(a) at least one awning, said at least one awning extending from near the top of said unit;
(b) a plurality of prop rods, said prop rods extending from said unit and adapted to support said at least one awning; and
(c) a plurality of prop rod brackets attached to a top exterior portion of said unit for engaging said plurality of prop rods for supporting said awning.

12. A portable arcade unit according to claim 11, further comprising:
a detachable roof section attached to a top portion of said unit, wherein said
detachable roof section resides on and is secured to said awning when said awning is in a propped position.

13. A portable arcade unit according to claim 12, wherein said detachable roof section is attached to said unit via a roof clip.

14. A portable arcade unit, comprising:
(a) a frame comprised of four uprights;
(b) a floor section supported by said frame;
(c) a first connection apparatus secured to a first end of said unit;
(d) a bogie, said bogie adapted to connect to said first connection apparatus, said bogie comprising at least one wheel positioned so as to elevate said first end of said unit when said bogie is connected to said unit;
(e) a second connection apparatus secured to a second end of said unit;
(f) a hitch portion, said hitch portion having a first end adapted to connect to said second connection apparatus and a second end adapted to connect to a vehicle capable of moving said unit, said hitch portion adapted to support and elevate said second end of said unit, when connected to said vehicle, such that said unit is completely elevated and supported when said bogie and said hitch portion, attached to said vehicle, are connected to said unit, wherein said unit is stationary and self-supporting when detached from said bogie and said hitch portion, and wherein said unit is elevated and may be moved when said hitch portion, attached to said vehicle, and said bogie are secured to said unit; and
(g) at least one arcade game contained in said unit; and
(h) at least one awning hingeably attached to said unit and wherein said awning may be propped in an up position when said unit is in a player ready mode and wherein said awning may be lowered when in a storage mode.

15. A portable arcade unit according to claim 14, further comprising:
awnings hingeably attached to all sides of said unit.

16. A portable arcade unit, further comprising:
awnings hingeably attached to all sides of said unit.

17. A portable arcade unit according to claim 16, further comprising:
a detachable roof secured to said awnings.

18. A portable arcade unit according to claim 17, wherein said detachable roof is comprised of:
a first roof panel having a first and second end;
a second roof panel having a first and second end;
a plurality or roof clips; wherein said first end of said first roof panels is adapted to be secured with said second end of said second roof panel and one of said roof clips.

19. A portable arcade unit according to claim 15, further comprising:
at least one game console hingeble attached to said unit, wherein said game console may be lowered to a player ready mode and raised for storage.

20. A portable arcade unit according to claim 14, further comprising:
at least one roll-up door secured to at least two of said uprights, wherein said roll-up door may be raised in a player ready mode.

21. A portable unit comprising:
(a) a frame;
(b) at least one awning movably attached to said unit and wherein said awning may be propped in an up position when said unit is in a player ready mode and wherein said awning may be lowered when in a storage mode;
(c) at least one game console movably attached to said unit;
(d) at least one arcade game housed in said unit; and
wherein said unit is adapted to connect to a detachable bogie, said bogie adapted to allow the transporting of said unit from one location to another.

22. A portable unit according to claim 21, further comprising:
- (a) a first connection apparatus secured to a first end of said unit;
- (b) a bogie, said bogie adapted to connect to said first connection apparatus, said bogie comprising at least one wheel positioned so as to elevate said first end of said unit when said bogie is connected to said unit;
- (c) a second connection apparatus secured to a second end of said unit; and
- (d) a hitch portion, said hitch portion having a first end adapted to connect to said second connection apparatus and a second end adapted to connect to a vehicle capable of moving said unit, said hitch portion adapted to support and elevate said second end of said unit, when connected to said vehicle, such that said unit is completely elevated and supported when said bogie and said hitch portion, attached to said vehicle, are connected to said unit;

wherein said unit is stationary and self-supporting when detached from said bogie and said hitch portion, and wherein said unit is elevated and may be moved when said hitch portion, attached to said vehicle, and said bogie are secured to said unit.

23. A portable unit according to claim 22, wherein said second connection apparatus comprises a tubular member extending from said first end of said unit to said second end of said unit.

24. A portable arcade unit for providing a moveable game transported by a vehicle, comprising:

an arcade game housed within the unit;

a detachable wheel attachment for connecting to the unit, said detachable wheel attachment comprising at least one wheel positioned so as to allow transport of the unit when said detachable wheel attachment is connected to the unit;

a second connection apparatus secured to a second end of the unit used to operationally connect the unit to a vehicle for transporting the unit when said detachable wheel attachment is connected to the unit;

wherein the unit is stationary when detached from said detachable wheel attachment and wherein the unit is portable when attached to said detachable wheel attachment.

25. A portable arcade unit according to claim 24, further comprising:

a detachable roof for covering the unit.

26. A portable arcade unit according to claim 24, further comprising:

a pair of game cabinets located in the unit wherein a first game cabinet extends down one side of the unit and wherein a second cabinet extends down a second side of the unit.

27. A portable arcade unit according to claim 26, further comprising:

a pair of game consoles, each of said game consoles hingeably attached to a correspond of said game cabinets.

28. A portable arcade unit, comprising:

an arcade game housed within the unit;

a wheel attachment connected to the unit, said wheel attachment comprising at least one wheel to allow transport of the unit, said wheel attachment detachable so that said wheel attachment may be detached when in a player ready mode and attached when in a portable mode; and at least one awning hingeably attached to the unit, and wherein said awning may be propped up in an up position when the unit is in a player ready mode and wherein said awning may be lowered when in a portable mode.

29. A portable arcade unit, comprising:

an arcade game housed within the unit;

a wheel attachment connected to the unit, said wheel attachment comprising at least one wheel to allow transport of the unit, said wheel attachment detachable so that said wheel attachment may be detached when in a player ready mode and attached when in a portable mode; and a detachable roof adapted to be secured to the unit.

* * * * *

UNITED STATES PATENT AND TRADEMARK OFFICE
CERTIFICATE OF CORRECTION

| | |
|---|---|
| PATENT NO. | : 6,289,637 B1 |
| DATED | : September 18, 2001 |
| INVENTOR(S) | : John F. Mendes, Jr. |

It is certified that error appears in the above-identified patent and that said Letters Patent is hereby corrected as shown below:

Column 6,
Line 47, please delete the word "hingeble" and replace it with -- hingeably --.

Column 8,
Line 15, please delete the word "correspond" and replace it with -- corresponding one --.

Signed and Sealed this

Fifth Day of March, 2002

Attest:

JAMES E. ROGAN
*Attesting Officer*  *Director of the United States Patent and Trademark Office*